(12) United States Patent
Sun et al.

(10) Patent No.: US 10,681,400 B2
(45) Date of Patent: Jun. 9, 2020

(54) METHOD AND DEVICE FOR TRANSMITTING VIDEO (71) Applicant: HANGZHOU HIKVISION DIGITAL TECHNOLOGY CO., LTD., Hangzhou (CN)

(72) Inventors: Youtong Sun, Hangzhou (CN); Xinyu Gu, Hangzhou (CN); Liang Zhang, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/482,988

(22) PCT Filed: Jan. 10, 2018

(86) PCT No.: PCT/CN2018/072117
§ 371 (c)(1),
(2) Date: Aug. 1, 2019

(87) PCT Pub. No.: WO2018/145551
PCT Pub. Date: Aug. 16, 2018

(65) Prior Publication Data
US 2019/0349616 A1 Nov. 14, 2019

(30) Foreign Application Priority Data
Feb. 9, 2017 (CN) .......................... 2017 1 0071846

(51) Int. Cl.
*H04N 21/234* (2011.01)
*H04N 21/2343* (2011.01)
(Continued)

(52) U.S. Cl.
CPC ... *H04N 21/23805* (2013.01); *H04N 21/2385* (2013.01); *H04N 21/2662* (2013.01); *H04N 21/26216* (2013.01)

(58) Field of Classification Search
None
See application file for complete search history.

(56) References Cited

U.S. PATENT DOCUMENTS

2009/0185619 A1* 7/2009 Taleb ................. H04N 21/2335
375/240.02
2013/0091249 A1* 4/2013 McHugh .......... H04N 21/23439
709/219
(Continued)

FOREIGN PATENT DOCUMENTS

CN 106302247 1/1917
CN 101077010 11/2007
(Continued)

OTHER PUBLICATIONS

Extended European Search Report issued in corresponding European Application No. 18751758.6, dated Oct. 18, 2019.
(Continued)

*Primary Examiner* — Brian T Pendleton
*Assistant Examiner* — Jean D Saint Cyr
(74) *Attorney, Agent, or Firm* — Norton Rose Fulbright US LLP (57) ABSTRACT

Disclosed is a method and device for transmitting video data. The method includes allocating a traffic to each piece of data to be transmitted at interval of a preset duration, and when a traffic that needs to be used by the data to be transmitted is larger than the traffic allocated to it, transmitting a part of the data to be transmitted using this allocated traffic, and transmitting the remaining data after a next traffic allocation is performed. By allocating traffic, the traffic for transmission can be controlled, thereby reducing possibility (Continued)

of network congestion caused by relatively large bandwidth being used for transmitting video resources. If the traffic that needs to be used by the data to be transmitted is larger than the traffic allocated to it, only part of the data is transmitted, and the remaining of the data will not be transmitted until traffic is allocated again.

17 Claims, 3 Drawing Sheets

(51) Int. Cl.

| | | |
|---|---|---|
| H04N 21/235 | (2011.01) |
| H04N 21/2365 | (2011.01) |
| H04N 21/238 | (2011.01) |
| H04N 21/24 | (2011.01) |
| H04N 21/258 | (2011.01) |
| H04N 21/262 | (2011.01) |
| H04N 21/432 | (2011.01) |
| H04N 21/435 | (2011.01) |
| H04N 21/44 | (2011.01) |
| H04N 21/442 | (2011.01) |
| H04N 21/6373 | (2011.01) |
| H04N 21/647 | (2011.01) |
| H04N 21/2385 | (2011.01) |
| H04N 21/2662 | (2011.01) |

(56) References Cited

U.S. PATENT DOCUMENTS

| | | | |
|---|---|---|---|
| 2013/0135427 A1* | 5/2013 | Wu | H04N 21/23655 348/14.09 |
| 2013/0227625 A1 | 8/2013 | Forsman et al. | |
| 2013/0254341 A1* | 9/2013 | Ramakrishnan | H04L 47/25 709/219 |
| 2014/0254380 A1* | 9/2014 | Swenson | H04N 21/64738 370/235 |

FOREIGN PATENT DOCUMENTS

| | | |
|---|---|---|
| CN | 103152649 | 6/2013 |
| CN | 103281509 | 9/2013 |
| CN | 104125429 | 10/2014 |
| CN | 104469302 | 3/2015 |
| WO | WO 03032599 | 4/2003 |
| WO | WO 2014134811 | 9/2014 |

OTHER PUBLICATIONS

International Search Report and Written Opinion issued in Corresponding International Patent Application No. PCT/CN2018/072117, dated Mar. 28, 2018.

* cited by examiner

METHOD AND DEVICE FOR TRANSMITTING VIDEO

CROSS-REFERENCE WITH RELATED APPLICATIONS

The present application is a national phase application under 35 U.S.C. § 371 of International Application No. PCT/CN2018/072117, filed Jan. 10, 2018, which claims priority to Chinese patent application No. 201710071846.8, filed Feb. 9, 2017, which are incorporated herein by reference in their entirety.

TECHNICAL FIELD

The present application relates to the technical field of videos, and in particular, to a method and device for transmitting video data.

BACKGROUND

With the continuous development of technologies, the resolution of video images is increasingly high, and pictures are increasingly clear. Meanwhile, videos use more and more bandwidth resources. If a bandwidth provided by a network is smaller than that required for transmitting video data, then problems such as lagging and delay will occur, or worse, congestion and break-down will occur.

Currently, many third-party softwares can control network traffic, which, when applied to video transmission, control bandwidth resources used by video data. Generally, the third-party software blocks or discards some data in the video to reduce the bandwidth resources used by the video.

However, the third-party software cannot identify the importance of each frame of image in the video, and when blocking or discarding data in the video, will block or discard important data in the video, thus preventing the video from being decoded and played normally.

SUMMARY

An objective of embodiments of the present application is to provide a method and device of transmitting video data that not only is capable of controlling the traffic for transmission, but also will not block and discard data in the video.

To achieve the above-described objective, embodiments of the present application disclose a method of transmitting video data, including:

determining each piece of data to be transmitted corresponding to each video transmitting request;

allocating a traffic to each determined piece of data to be transmitted at an interval of a preset duration;

for each piece of data to be transmitted, determining whether the traffic allocated to the piece of data to be transmitted is smaller than a traffic used by the data to be transmitted;

if the traffic allocated to the piece of data to be transmitted is not smaller than the traffic used by the data to be transmitted, transmitting the data to be transmitted using the allocated traffic;

if the traffic allocated to the piece of data to be transmitted is smaller than the traffic used by the data to be transmitted, determining target data in the data to be transmitted, wherein a traffic used by the target data is not larger than the allocated traffic; and transmitting the target data using the allocated traffic, and in the case of next traffic allocation after allocating the traffic, transmitting data in the data to be transmitted other than the target data by using a next allocated traffic.

Optionally, the step of allocating a traffic to each determined piece of data to be transmitted may include:

determining a weight for each piece of data to be transmitted based on a preset correspondence between data properties and weights; and allocating a traffic to each piece of data to be transmitted based on the amount of available traffic in a network in which the data to be transmitted is located and the determined weight.

Optionally, the method may further include:

determining whether a traffic threshold set by a user exists;

if the traffic threshold exists, determining the amount of available traffic as the traffic threshold; and if the traffic threshold does not exist, monitoring the amount of available traffic.

Optionally, the data to be transmitted includes an intra picture frame to be sent; the step of determining target data in the data to be transmitted may include:

determining whether a traffic used by the intra picture frame to be sent is larger than the allocated traffic;

if the traffic used by intra picture frame to be sent is larger than the allocated traffic, selecting the target data in the intra picture frame to be sent; and if the traffic used by intra picture frame to be sent is not larger than the allocated traffic, determining the intra picture frame to be sent as the target data.

Optionally, when the data to be transmitted is preview data, the intra picture frame to be sent is the newest intra picture frame in the buffer;

when the traffic used by the intra picture frame to be sent is smaller than the allocated traffic, after transmitting the newest intra picture frame by using the allocated traffic, the method may further include:

determining whether the remaining of the allocated traffic exists;

if the remaining of the allocated traffic exists, detecting whether a new intra picture frame exists in the buffer;

if the new intra picture frame exists, determining whether a traffic used by the new intra picture frame is larger than the remaining of the allocated traffic;

if the traffic used by the new intra picture frame is larger than the remaining of the allocated traffic, sending a part of data in the new intra picture frame using the remaining of the allocated traffic; and if the traffic used by the new intra picture frame is not larger than the remaining of the allocated traffic, sending the new intra picture frame using the remaining of the allocated traffic; and returning to the determining whether the remaining of the allocated traffic exists.

Optionally, if the new intra picture frame does not exist in the buffer, the method may further include:

sending a non-picture frame corresponding to a target intra picture frame using the remaining of the allocated traffic, wherein the target intra picture frame is: the newest intra picture frame, or a new intra picture frame detected previously.

Optionally, when the data to be transmitted is replay data, the step of determining whether the traffic used by the intra picture frame to be sent is larger than the allocated traffic may include:

determining intra picture frames to be sent based on a received replay instruction;

determining whether a traffic used by all the determined intra picture frames to be sent is larger than the allocated traffic;

the step of selecting the target data in the intra picture frame to be sent may include:

extracting a target intra picture frame in the determined intra picture frames to be sent as the target data based on the replay instruction and the allocated traffic;

the step of determining the intra picture frame to be sent as the target data may include:

extracting a target non-picture frame in non-picture frames corresponding to the intra picture frames to be sent; and determining the target non-picture frame and the intra picture frames to be sent as the target data.

Optionally, the step of extracting a target intra picture frame in the determined intra picture frames to be sent as the target data based on the replay instruction and the allocated traffic may include:

determining replay speed information carried in the replay instruction;

calculating an extraction interval by using a first preset rule, based on the replay speed information, a size and time interval of the intra picture frames to be sent, and the allocated traffic; and extracting the target intra picture frame in the intra picture frames to be sent as the target data at the extraction interval; and the step of extracting a target non-picture frame in non-picture frames corresponding to the intra picture frames to be sent includes:

determining a size and duration of the replay data based on the replay instruction;

calculating an extraction speed by using a second preset rule, based on the size and duration of the replay data, the size and time interval of the intra picture frames to be sent, and the allocated traffic; and extracting the target non-picture frame in the non-picture frames corresponding to the intra picture frames to be sent with the extraction speed.

Optionally, the step of calculating an extraction interval by using a first preset rule, based on the replay speed information, a size and time interval of the intra picture frames to be sent, and the allocated traffic, may include:

calculating the extraction interval by the following formula:

$$\text{Extraction Interval} = \text{Size of Intra picture Frames}/(\text{Allocated traffic} * \text{Time Interval of Intra picture Frames}/\text{Replay Speed});$$

the step of calculating an extraction speed by using a second preset rule, based on the size and duration of the replay data, the size and time interval of the intra picture frames to be sent, and the allocated traffic, includes:

calculating the extraction speed by the following formula:

$$\text{Extraction Speed} = \{[\text{Allocated traffic} - (\text{Size of Intra picture Frames}/\text{Time Interval of Intra picture Frames})]/(\text{Size of Replay Data}/\text{Duration of Replay Data}) * (\text{Frame Rate} - 1/\text{Time Interval of Intra picture Frames})\}/1 \text{ s}.$$

Optionally, before the step of allocating a traffic to each determined piece of data to be transmitted at an interval of a preset duration, the method may further includes:

determining whether the sum of traffic used by all pieces of data to be transmitted is larger than the available traffic in the network; if the sum is not larger than the available traffic, directly transmitting each piece of data to be transmitted; if the sum is larger than the available traffic, executing the step of allocating a traffic to each determined piece of data to be transmitted at an interval of a preset duration;

or, monitoring whether preview data in the buffer is overwritten; if no preview data in the buffer is overwritten, directly transmitting each piece of data to be transmitted; if the preview data in the buffer is overwritten, executing the step of allocating a traffic to each determined piece of data to be transmitted at an interval of a preset duration;

or, monitoring whether a delay in the replay data exists; if no delay in the replay data exists, directly transmitting each piece of data to be transmitted; if the delay in the replay data exists, executing the step of allocating a traffic to each determined piece of data to be transmitted at an interval of a preset duration.

To achieve the above-described objective, embodiments of the present application also disclose a device of transmitting video data, including:

a first determining module, configured for determining each piece of data to be transmitted corresponding to each video transmitting request;

an allocating module, configured for allocating a traffic to each determined piece of data to be transmitted at an interval of a preset duration;

a first judging module, configured for, for each piece of data to be transmitted, determining whether the traffic allocated to the piece of data to be transmitted is smaller than a traffic used by the data to be transmitted; if the traffic allocated to the piece of data to be transmitted is not smaller than the traffic used by the data to be transmitted, triggering a first transmitting module; if the traffic allocated to the piece of data to be transmitted is smaller than the traffic used by the data to be transmitted, triggering a second determining module;

the first transmitting module, configured for transmitting the data to be transmitted using the allocated traffic;

the second determining module, configured for determining target data in the data to be transmitted, wherein a traffic used by the target data is not larger than the allocated traffic;

a second transmitting module, configured for transmitting the target data using the allocated traffic; and a third transmitting module, configured for, in the case of next traffic allocation after allocating the traffic, transmitting data in the data to be transmitted other than the target data by using a next allocated traffic.

Optionally, the allocating module is further configured for:

determining a weight for each piece of data to be transmitted based on a preset correspondence between data properties and weights; and allocating a traffic to each piece of data to be transmitted based on the amount of available traffic in a network in which the data to be transmitted is located and the determined weight.

Optionally, the device may further include:

a second judging module, configured for determining whether a traffic threshold set by a user exists; if the traffic threshold exists, triggering a third determining module; if the traffic threshold does not exist, triggering a first monitoring module;

the third determining module, configured for determining the amount of available traffic as the traffic threshold; and the first monitoring module, configured for monitoring the amount of available traffic.

Optionally, the data to be transmitted includes an intra picture frame to be sent; the second determining module includes:

a judging sub-module, configured for determining whether a traffic used by the intra picture frame to be sent is larger than the allocated traffic; if the traffic is larger than the allocated traffic, triggering a selecting sub-module; if the traffic is not larger than the allocated traffic, triggering a determining sub-module;

the selecting sub-module, configured for selecting the target data in the intra picture frame to be sent; and the determining sub-module, configured for determining the intra picture frame to be sent as the target data.

Optionally, when the data to be transmitted is preview data, the intra picture frame to be sent is the newest intra picture frame in the buffer; the device may further includes:

a fourth determining module, configured for, when the traffic used by the intra picture frame to be sent is smaller than the allocated traffic, after the second transmitting module transmits the newest intra picture frame by using the allocated traffic, determining whether the remaining of the allocated traffic exists; and if the remaining of the allocated traffic exists, triggering a detecting module;

the detecting module, configured for detecting whether a new intra picture frame exists in the buffer; if the new intra picture frame exists, triggering a third judging module;

the third judging module, configured for determining whether a traffic used by the new intra picture frame is larger than the remaining of the allocated traffic; if the traffic is larger than the remaining of the allocated traffic, triggering a first sending module; if the traffic is not larger than the remaining of the allocated traffic, triggering a second sending module;

the first sending module, configured for sending a part of data in the new intra picture frame using the remaining of the allocated traffic;

the second sending module, configured for sending the new intra picture frame using the remaining of the allocated traffic; and triggering the fourth determining module.

Optionally, the device may further include:

a third sending module, configured for, if the new intra picture frame does not exist in the buffer, sending a non-picture frame corresponding to a target intra picture frame using the remaining of the allocated traffic, wherein the target intra picture frame is: the newest intra picture frame, or a new intra picture frame detected previously.

Optionally, when the data to be transmitted is replay data, the judging sub-module is further configured for:

determining intra picture frames to be sent based on a received replay instruction;

determining whether a traffic used by all the determined intra picture frames to be sent is larger than the allocated traffic;

the selecting sub-module is further configured for:

extracting a target intra picture frame in the determined intra picture frames to be sent as the target data based on the replay instruction and the allocated traffic;

the determining sub-module is further configured for:

extracting a target non-picture frame in non-picture frames corresponding to the intra picture frames to be sent; and determining the target non-picture frame and the intra picture frames to be sent as the target data.

Optionally, the selecting sub-module may include:

a first determining unit, configured for determining replay speed information carried in the replay instruction;

a first calculating unit, configured for calculating an extraction interval by using a first preset rule, based on the replay speed information, a size and time interval of the intra picture frames to be sent, and the allocated traffic; and a first extracting unit, configured for extracting the target intra picture frame in the intra picture frames to be sent as the target data at the extraction interval;

the determining sub-module may include:

a second determining unit, configured for determining a size and duration of the replay data based on the replay instruction;

a second calculating unit, configured for calculating an extraction speed by using a second preset rule, based on the size and duration of the replay data, the size and time interval of the intra picture frames to be sent, and the allocated traffic;

a second extracting unit, configured for extracting the target non-picture frame in the non-picture frames corresponding to the intra picture frames to be sent with the extraction speed; and a third determining unit, configured for determining the target non-picture frame and the intra picture frames to be sent as the target data.

Optionally, the first calculating unit may further configured for:

calculating the extraction interval by the following formula:

Extraction Interval=Size of Intra picture Frames/ (Allocated traffic*Time Interval of Intra picture Frames/Replay Speed);

the second calculating unit may further configured for:

calculating the extraction speed by the following formula:

Extraction Speed={[Allocated traffic—(Size of Intra picture Frames/Time Interval of Intra picture Frames)]/(Size of Replay Data/Duration of Replay Data)*(Frame Rate—1/Time Interval of Intra picture Frames)}/1 s.

Optionally, the device may further include:

a fourth determining module, configured for determining whether the sum of traffic used by all pieces of data to be transmitted is larger than the available traffic in the network; if the sum is not larger than the available traffic, directly transmitting each piece of data to be transmitted; if the sum is larger than the available traffic, triggering the allocating module;

or, a second monitoring module, configured for monitoring whether preview data in the buffer is overwritten; if no preview data in the buffer is overwritten, directly transmitting each piece of data to be transmitted; if the preview data in the buffer is overwritten, triggering the allocating module;

or, a third monitoring module, configured for monitoring whether a delay in the replay data exists; if no delay in the replay data exists, directly transmitting each piece of data to be transmitted; if the delay in the replay data exists, triggering the allocating module.

To achieve the above-described objective, embodiments of the present application further disclose an electronic device including a processor and a memory. The memory is used for storing executable program codes, and the processor executes a program corresponding to the executable program codes by reading the executable program codes stored in the memory, so as to perform any one of methods of transmitting video data described above.

To achieve the above-described objective, embodiments of the invention further disclose an executable program code, which, when executed, performs any one of methods of transmitting video data described above.

To achieve the above-described objective, embodiments of the invention further disclose a computer readable storage medium used for storing executable program codes, which, when executed, perform any one of methods of transmitting video data described above.

By applying the embodiments of the present application, the traffic is allocated to each determined piece of data to be transmitted, when the traffic that needs to be used by the data to be transmitted is larger than the traffic allocated to it, a part of the data to be transmitted is transmitted using this allocated traffic, and the remaining of the data is transmitted after a next traffic allocation is performed. It can be seen that, on one hand, by allocating traffic, the traffic for transmission can be controlled, thereby reducing possibility of network congestion caused by relatively large bandwidth being used for transmitting video resources. On the other hand, if the traffic that needs to be used by the data to be transmitted is larger than the traffic allocated to it, only a part of the data is transmitted, and the remaining of the data will not be transmitted until traffic is allocated again. In other words, the present solution will not block and discard data in a video, and the video can be normally decoded and played.

Of course, any product or method implementing the present application does not necessarily have all of the advantages described above at the same time.

BRIEF DESCRIPTION OF FIGURES

In order to more clearly describe the technical solutions of the embodiments of the present application or of the prior art, drawings that need to be used in embodiments and the prior art will be briefly described below. Obviously, the drawings provided below are for only some embodiments of the present application; those skilled in the art can also obtain other drawings based on these drawings without any creative efforts.

DETAILED DESCRIPTION OF THE EMBODIMENTS

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

To solve the above-described technical problem, embodiments of the present application provide a method and device for transmitting video data, which is applicable to various kinds of electronic devices. This is not limited herein. A method for transmitting video data according to an embodiment of the present application is described below in detail.

Figure 1:
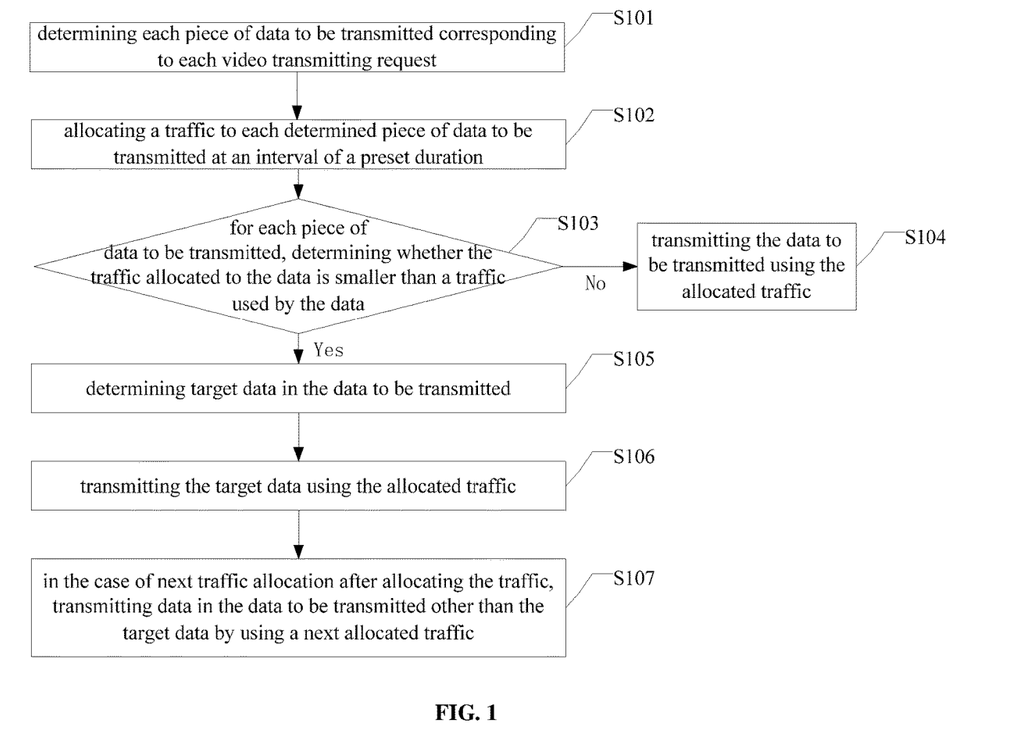
FIG. 1 is a flow chart of a method for transmitting video data according to an embodiment of the present application.

FIG. 1 is a flow chart of a method for transmitting video data according to an embodiment of the present application. The method includes the following operations.

S101: Determining each piece of data to be transmitted corresponding to each video transmitting request.

It can be understood that an electronic device executing the present solution can receive video transmitting requests sent by multiple users or multiple user devices, and determine data to be transmitted corresponding to each video transmitting request. A video transmitting request may correspond to one piece of data to be transmitted, or multiple pieces of data to be transmitted. This is not limited herein.

S102: Allocating a traffic to each determined piece of data to be transmitted at an interval of a preset duration.

The preset duration may be set according to the actual situation. For example, it may be set to 1 s. In this case, the traffic is allocated once at an interval of 1 s.

In an implementation, a corresponding weight of each piece of data to be transmitted may be determined based on a preset correspondence between data properties and weights. The traffic is allocated to each piece of data to be transmitted based on the amount of traffic available in the network in which the data to be transmitted is located and the determined weight.

For example, the data properties may include user identity information corresponding to the data, data type (which may be classified as a type of preview data and a type of replay data), and information of an acquisition device that acquires the data, etc.

Weights may be set for the above data properties. For example, if a user corresponding to data (a user requesting the data) is an ordinary user, then a weight for the data may be relatively small, and if a user corresponding to data is a VIP (very important person), then a weight for the data may be relatively large. Weights for preview data and replay data may be set based on the ratio of playing them in the normal situation. The information of an acquisition device may include geographic location information of the acquisition device. If the geographic location of the acquisition device is an accident-prone area, then a weight for data acquired by the acquisition device may be relatively large, and so on.

In an implementation, an interactive interface may be provided. A user may input the above-described information related to weights in the interactive interface. The device sets weights according to information input by the user. Alternatively, the device may perform statistical analysis of historical data and set weights based on statistical results.

There may be multiple pieces of data to be transmitted. As described above, the weight of each piece of data to be transmitted can be determined. Assume there are three pieces of data to be transmitted A, B, and C. The data to be transmitted A is preview data requested by a VIP user, and an acquisition device corresponding to the data A is located in a geographical location with relatively high importance. The data to be transmitted B is preview data requested by an ordinary user, and an acquisition device corresponding to the data B is located in a geographical location with relatively low importance. The data to be transmitted C is replay data requested by an ordinary user, and an acquisition device corresponding to the data C is located in a geographical location with relatively low importance.

Assume that the weight for A is 60%, the weight for B is 30%, and the weight for C is 10%. Assume 1000 MB of available traffic exists, then 600 MB of traffic is allocated to A, 300 MB of traffic is allocated to B, and 100 MB of traffic is allocated to C.

In an implementation, the determining traffic available in the network in which the data to be transmitted is located may include:

determining whether a traffic threshold set by a user exists;

if yes, determining the amount of the available traffic as the traffic threshold; and if not, monitoring the amount of the available traffic.

It can be understood that in some cases, a user may set an upper threshold of the traffic. In these cases, the traffic threshold set by the user may be determined as the amount of the available traffic. If no traffic threshold is set by the user, then the amount of the available traffic needs to be monitored. Specifically, the amount of the available traffic may be obtained by calling a network writing port. There may be multiple ways of monitoring. This is not limited herein.

S103: For each piece of data to be transmitted, determining whether a traffic allocated to the piece of data to be transmitted is smaller than a traffic used by the data to be transmitted; if not, executing S104; if yes, executing S105.

S104: Transmitting the data to be transmitted using the allocated traffic.

S105: Determining target data in the data to be transmitted, wherein a traffic used by the target data is no larger than the allocated traffic.

It can be understood that, for each piece of data to be transmitted, if the traffic allocated to the piece of data to be transmitted is larger than or equal to the traffic used by the piece of data to be transmitted, then the piece of data to be transmitted may be transmitted directly using the traffic allocated to the piece of data to be transmitted; if the traffic allocated to the piece of data to be transmitted is smaller than the traffic used by the piece of data to be transmitted, then only a part of the data (target data) may be transmitted using the allocated traffic. The traffic used by this part of the data (target data) may be equal to or smaller than the allocated traffic.

As described above, the data to be transmitted may be preview data or replay data. Both preview data and replay data contain an intra picture frame, called I frame. Those skilled in the art can understand that an I frame is the first frame in a GOP (Group of Pictures), and is of relatively high importance. Therefore, the process of determining target data may include:

determining whether traffic used by an intra picture frame to be sent is larger than the allocated traffic;

if yes, selecting the target data in the intra picture frame to be sent; and if not, determining the intra picture frame to be sent as the target data.

In other words, when the traffic used by the data to be transmitted is larger than the traffic allocated to the data to be transmitted, the priority is given to transmitting the I frames in the data. If the traffic used by the I frames is not larger than the allocated traffic, then all the I frames are transmitted. If the traffic used by the I frames is larger than the allocated traffic, then a part of the I frames is selected for transmission.

When the data to be transmitted is preview data, the intra picture frame to be sent is the newest intra picture frame in a buffer.

Figure 2:
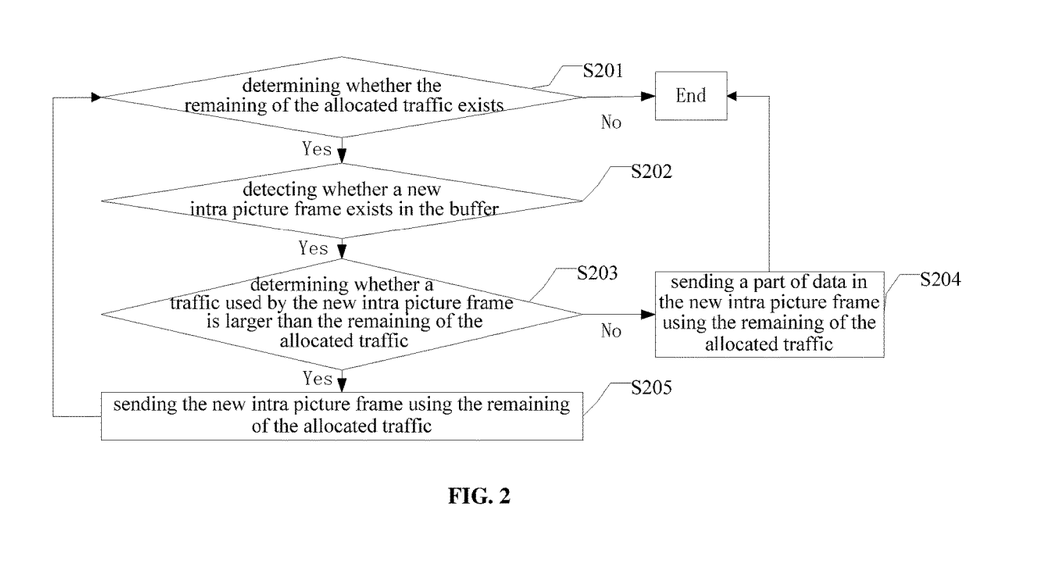
FIG. 2 is a flow chart showing a transmission of preview data according to an embodiment of the present application.

When the traffic used by the intra picture frame to be sent is smaller than the allocated traffic, after transmitting the newest intra picture frame using the allocated traffic, the flow chart shown in FIG. 2 may be executed.

S201: Determining whether the remaining of the allocated traffic exists; if yes, executing S202; if not, ending the process.

S202: Detecting whether a new intra picture frame exists in the buffer; if yes, executing S203.

S203: Determining whether a traffic used by the new intra picture frame is larger than the remaining of the allocated traffic; if yes, executing S204; if not, executing S205.

S204: Sending a part of data in the new intra picture frame using the remaining of the allocated traffic, and then ending the process.

S205: Sending the new intra picture frame using the remaining of the allocated traffic; and returning to S201. The process does not end until all the allocated traffic has been used.

A person skilled in the art can understand that, preview data is generally written into a ring buffer by a DSP (Digital Signal Processing) module, and the preview data in the ring buffer is read and sent by an application layer to a remote terminal for display. The ring buffer includes a read pointer maintained by the application layer and a write pointer maintained by the DSP module. When the bandwidth is insufficient, the speed of a write operation executed by the DSP module is faster than the speed of a read operation executed by the application lawyer, which will result in data overlapping and loss of preview data.

If the data to be transmitted is preview data, the newest I frame in the ring buffer is generally transmitted during data transmission. In this way, the possibility of data loss can be reduced. It should be noted that the preview data can be acquired by the acquisition device in real time and sent to the device. In this case, a new I frame is being constantly generated in the buffer.

For example, if the data to be transmitted A is preview data, 600 MB of traffic is allocated to A, and the traffic used by the newest I frame in the buffer is 60 MB, then the newest I frame is transmitted using 60 MB of traffic. After the transmission, a new I frame is generated in the buffer and will use 80 MB of traffic. Then, this newly generated I frame is transmitted using 80 MB of traffic. If a new I frame is being constantly generated, then the new I frame is constantly being transmitted, until the 600 MB has been used up.

If the remaining of the allocated traffic is smaller than the traffic used by the new I frame, then only part of data in the new I frame can be transmitted, and after this part of data is transmitted, it can be considered that there is no remaining traffic, and the process in FIG. 2 ends.

If in the above-described process, S202 detects that no new intra picture frame exists in the buffer, then a non-picture frame corresponding to a target intra picture frame can be sent using the remaining traffic. The target intra picture frame is: the newest intra picture frame, or the new intra picture frame previously detected.

The target intra picture frame can be understood as a last transmitted I frame during data transmission using the current allocated traffic. If the I frame has been transmitted only once, and no new I frame is generated in the buffer, then the target intra picture frame is the newest intra picture frame; if after multiple I frames are transmitted, no new I frame is generated in the buffer, then the target intra picture frame is the new intra picture frame detected previously.

In the above-described example, if no new I frame is generated, and the 600 MB of traffic has not been used up, then a non-picture frame corresponding to the target intra picture frame can be transmitted. The non-picture frame may be a P frame or B frame. The non-picture frame corresponding to the target intra picture frame can be understood as: P frame or B frame after the last transmitted I frame. "After" is not limited to the P frame or B frame immediately adjacent to the I frame, and may be the P frame or B frame after the P frame or B frame immediately adjacent to the I frame.

In other words, priority is given to transmitting I frame(s). After the transmission of I frame(s), if the remaining traffic exists, then P frame(s) or B frame(s) is transmitted, until the allocated traffic is used up.

When the data to be transmitted is replay data, the determining whether the traffic used by the intra picture frame to be sent is larger than the allocated traffic may include:

determining intra picture frames to be sent based on a received replay instruction;

determining whether a traffic used by all the determined intra picture frames to be sent is larger than the allocated traffic.

The selecting target data in the intra picture frame to be sent may include:

extracting a target intra picture frame in the determined intra picture frames to be sent as the target data based on the replay instruction and the allocated traffic.

The determining the intra picture frame to be sent as target data may include:

extracting a target non-picture frame in non-picture frames corresponding to the intra picture frames to be sent; and determining the target non-picture frame and the intra picture frames to be sent as the target data.

Figure 3:
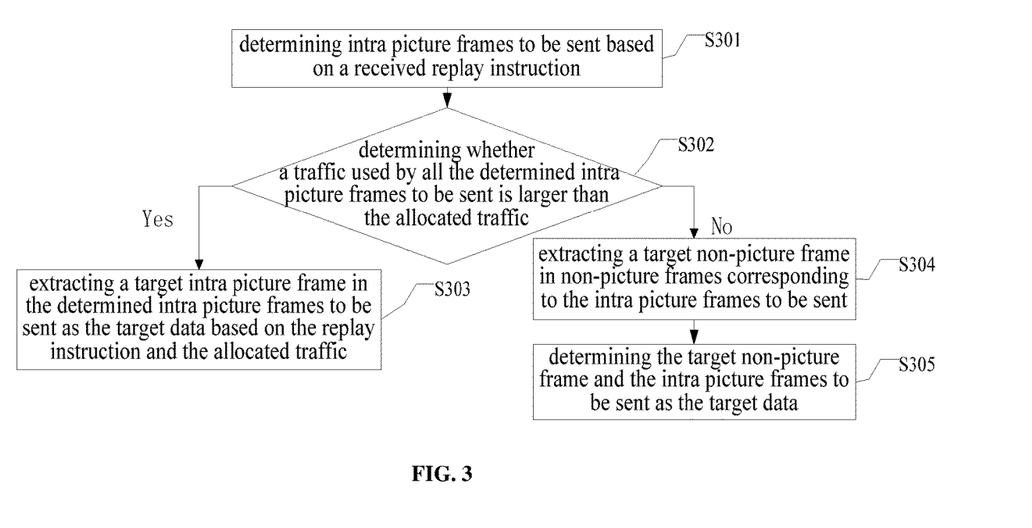
FIG. 3 is a flow chart showing a transmission of replay data according to an embodiment of the present application.

The above-described process can be understood in connection with the flowchart shown in FIG. 3.

S301: Based on a received replay instruction, determining intra picture frames to be sent.

S302: Determining whether a traffic used by all the determined intra picture frames to be sent is larger than the allocated traffic; if yes, executing S303; if not, executing S304.

S303: Based on the replay instruction and the allocated traffic, extracting a target intra picture frame in the intra picture frame to be sent determined as the target data.

S304: Extracting a target non-picture frame in non-picture frames corresponding to the intra picture frames to be sent.

S305: Determining the target non-picture frame and the intra picture frames to be sent as the target data.

A person skilled in the art can understand that the replay data is not data acquired and sent by the acquisition device in real time. The replay data may be historical data stored in the current device or other devices. The current device may receive a replay instruction sent by a user, which may carry identification information, replay speed information, etc. of the replay data.

The current device can determine replay data to be transmitted based on identification information of the replay data carried in a replay instruction, and further can determine a intra picture frame to be sent in the replay data, i.e., an I frame to be sent.

Specifically, in S302, Size of I frames—(Allocated traffic*Time interval of I frames/Replay speed) can be calculated. If the calculation result is larger than or equal to 0, the determination result in S302 is that the traffic used by all the I frames to be sent is not larger than the allocated traffic, that is, all the I frames can be sent out. If the calculation result is smaller than 0, the determination result in S302 is that the traffic used by all the I frames to be sent is larger than the allocated traffic, that is, not all the I frames can be sent out.

When the determination result in S302 is that the traffic used by all the I frames to be sent is larger than the allocated traffic, i.e., when the traffic is not enough to transmit all the I frames, a part of the I frames can be extracted for transmission. In an implementation, S303 may include:

determining replay speed information carried in the replay instruction;

calculating an extraction interval by using a first preset rule, based on the replay speed information, the size and time interval of the intra picture frames to be sent, and the allocated traffic; and extracting a target intra picture frame in the intra picture frames to be sent as target data at the extraction interval.

Specifically, the extraction interval can be calculated using the following formula:

Extraction Interval=Size of Intra picture Frames/
(Allocated traffic*Time Interval of Intra picture
Frames/Replay Speed).

If the result of the calculation is 2, then one I frame out of every two I frames is extracted (as target data) for transmission.

When the determination result in S302 is that the traffic used by all the I frames to be sent is not larger than the allocated traffic, all the I frames can be transmitted. In addition, if after all the I frames are transmitted, the remaining traffic still exists, then a target non-picture frame can be extracted in non-picture frames corresponding to the intra picture frames to be sent. The target non-picture frame and the intra picture frames to be sent are determined as target data.

In an implementation, the size and duration of the replay data can be determined based on the replay instruction.

An extraction speed is calculated by using a second preset rule, based on the size and duration of the replay data, the size and time interval of the intra picture frames to be sent, and the allocated traffic.

A target non-picture frame is extracted in the non-picture frames corresponding to the intra picture frames to be sent, with the extraction speed.

Specifically, an extraction speed can be calculated using the following formula:

Extraction Speed={[Allocated traffic—(Size of Intra
picture Frames/Time Interval of Intra picture
Frames)]/(Size of Replay Data/Duration of
Replay Data)*(Frame Rate—1/Time Interval of
Intra picture Frames)}/1 s wherein, {[Allocated traffic—(Size of Intra picture Frames/Time Interval of Intra picture Frames)]/(Size of Replay Data/Duration of Replay Data)*(Frame Rate—1/Time Interval of Intra picture Frames)} represents the number of non-I frames that can be transmitted within 1 s. If the number is 10, then 10 non-I frames can be transmitted within 1 s, and the extraction speed is 10 frames per second.

The target non-I frames are extracted with the extraction speed and transmitted.

It should be noted that the extraction interval and extraction speed are recalculated after each time traffic is allocated. In this way, the accuracy of the extraction of frame can be improved.

S106: Transmitting the target data using the allocated traffic.

S107: In the case of next traffic allocation after allocating the traffic, transmitting data in the data to be transmitted other than the target data by using the next allocated traffic.

In other words, the data in the data to be transmitted other than the target data is transmitted using a traffic allocated to the data to be transmitted next time.

It can be understood that traffic is allocated once at an interval of a preset duration in S102. If the next allocated traffic is sufficient to transmit the data to be transmitted, then the data is directly transmitted; if the next allocated traffic is still not enough to transmit the data to be transmitted, then target data is determined and only target data is transmitted. The above-described process is to repeat execution of the present technical solution, and is not described again. It should be noted that, data to be transmitted after the next traffic allocation includes not only data to be transmitted currently, but also a part of the data to be transmitted previously which is not transmitted, i.e., "data in the data to be transmitted other than the target data".

In the present embodiment, S107 may be executed after it is detected that the next traffic allocation is performed; or, S107 may be executed after a waiting duration determined based on the interval in which traffic is allocated (the preset duration in S102) has elapsed. For example, if traffic is allocated once at an interval of 1 s, then S107 may be executed after 0.5 s after using this allocated traffic to transmit data. The waiting duration can be adjusted based on actual circumstances.

It should be noted that, before S102 is executed, it may be determined whether the sum of traffic used by all pieces of data to be transmitted is larger than the available traffic in a network in which the piece of data is located. If not, each piece of data to be transmitted is directly transmitted. If yes, S102 is executed.

It can be understood that, if the sum of the traffic used by all pieces of data to be transmitted is not larger than the available traffic, the traffic is sufficient, the network status is relatively good, and there is no need for data traffic control, i.e., there is no need for executing S102 and subsequent steps.

Alternatively, whether preview data in the buffer is overwritten may be monitored, or, whether delay in the replay data exists may be monitored. If not, then each piece of data to be transmitted is directly transmitted. If yes, then S102 is executed.

Similarly, if it is monitored that no preview data in the buffer is overwritten, the network status is relatively good. If no delay in the replay data exists, the network status is relatively good. In these cases, there is no need for data traffic control, i.e., there is no need for executing S102.

Specifically, the data to be transmitted may include preview data and/or replay data. To determine the sum of the traffic used by the data to be transmitted, the traffic used by preview data and the traffic used by replay data can be determined, respectively.

Figure 4:
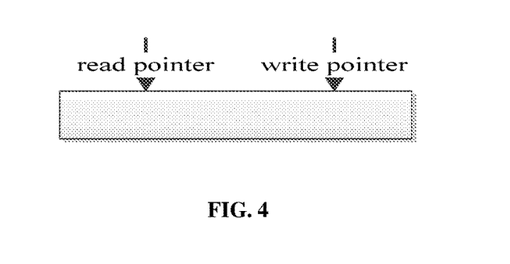
FIG. 4 is a schematic view of a buffer according to an embodiment of the present application.

A ring buffer can be as shown in FIG. 4. The size of data written into the ring buffer by the DSP module can be determined by performing statistic of the displacement of the write pointer in FIG. 4, and thus the traffic used by preview data can be determined.

The traffic used by preview data can be: (size of data written into the ring buffer by the DSP module)/(duration for performing statistic).

To calculate the traffic used by replay data, first the data to be replayed is determined based on a received replay instruction. The traffic used by replay data can be calculated using size of the replay data duration of transmission.

By applying the embodiment of the present application shown in FIG. 1, the traffic is allocated to each determined piece of data to be transmitted, when the traffic that needs to be used by the data to be transmitted is larger than the traffic allocated to it, a part of the data to be transmitted is transmitted using this allocated traffic, and the remaining of the data is transmitted after a next traffic allocation is performed. It can be seen that, on one hand, by allocating traffic, the traffic for transmission can be controlled, thereby reducing possibility of network congestion caused by relatively large bandwidth being used for transmitting video resources. On the other hand, if the traffic that needs to be used by the data to be transmitted is larger than the traffic allocated to it, only a part of the data is transmitted, and the remaining of the data will not be transmitted until traffic is allocated again. In other words, the present solution will not block and discard data in a video, and the video can be normally decoded and played.

Corresponding to the above method embodiment, embodiments of the present application further provide a device of transmitting video data.

Figure 5:
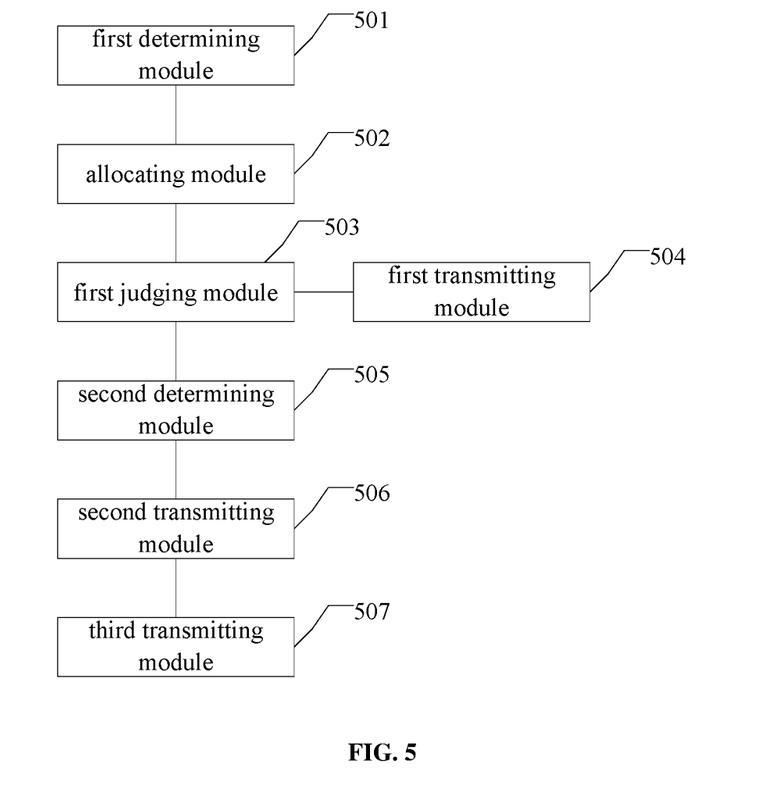
FIG. 5 is a schematic diagram showing a structure of a device for transmitting video data according to an embodiment of the present application.

FIG. 5 is a schematic diagram of a device for transmitting video data according to an embodiment of the present application. The device includes:

a first determining module 501, configured for determining each piece of data to be transmitted corresponding to each video transmitting request;

an allocating module 502, configured for allocating a traffic to each determined piece of data to be transmitted at an interval of a preset duration;

a first judging module 503, configured for, for each piece of data to be transmitted, determining whether the traffic allocated to the piece of data to be transmitted is smaller than a traffic used by the data to be transmitted; if the traffic allocated to the piece of data to be transmitted is not smaller than the traffic used by the data to be transmitted, triggering a first transmitting module 504; if the traffic allocated to the piece of data to be transmitted is smaller than the traffic used by the data to be transmitted, triggering a second determining module 505;

the first transmitting module 504, configured for transmitting the data to be transmitted using the allocated traffic;

the second determining module 505, configured for determining target data in the data to be transmitted, wherein a traffic used by the target data is not larger than the allocated traffic;

a second transmitting module 506, configured for transmitting the target data using the allocated traffic; and a third transmitting module 507, configured for, in the case of next traffic allocation after allocating the traffic, transmitting data in the data to be transmitted other than the target data by using a next allocated traffic allocated.

In other words, the third transmitting module 507 is configured for transmitting data in the data to be transmitted other than the target data by using a traffic allocated to the data to be transmitted next time.

In the embodiment, the allocating module 502 may be further configured for:

determining a weight for each piece of data to be transmitted based on a preset correspondence between data properties and weights; and allocating a traffic to each piece of data to be transmitted based on the amount of available traffic in a network in which the data to be transmitted is located and the determined weight.

In the embodiment, the device may further include: a second judging module, a third determining module, and a first monitoring module (not shown in the figure).

The second judging module is configured for determining whether a traffic threshold set by a user exists; if the traffic threshold exists, triggering the third determining module; if the traffic threshold does not exist, triggering the first monitoring module.

The third determining module is configured for determining the amount of available traffic as the traffic threshold.

The first monitoring module is configured for monitoring the amount of available traffic.

In the embodiment, the data to be transmitted includes an intra picture frame to be sent. the second determining module 505 may include: a judging sub-module, a selecting sub-module and a determining sub-module (not shown in the figures).

The judging sub-module is configured for determining whether a traffic used by the intra picture frame to be sent is larger than the allocated traffic; if the traffic is larger than the allocated traffic, triggering the selecting sub-module; if the traffic is not larger than the allocated traffic, triggering the determining sub-module;

The selecting sub-module is configured for selecting the target data in the intra picture frame to be sent.

the determining sub-module is configured for determining the intra picture frame to be sent as the target data.

In the embodiment, when the data to be transmitted is preview data, the intra picture frame to be sent is the newest intra picture frame in the buffer. The device may further include: a fourth determining module, a detecting module, a third judging module, a first sending module, and a second sending module (not shown in the figure).

The fourth determining module is configured for, when the traffic used by the intra picture frame to be sent is smaller than the allocated traffic, after the second transmitting module transmits the newest intra picture frame by using the allocated traffic, determining whether the remaining of the allocated traffic exists.

The detecting module is configured for detecting whether a new intra picture frame exists in the buffer; if the new intra picture frame exists, triggering the third judging module.

The third judging module is configured for determining whether a traffic used by the new intra picture frame is larger than the remaining of the allocated traffic; if the traffic is larger than the remaining of the allocated traffic, triggering the first sending module; if the traffic is not larger than the remaining of the allocated traffic, triggering the second sending module.

The first sending module is configured for sending a part of data in the new intra picture frame using the remaining of the allocated traffic.

The second sending module is configured for sending the new intra picture frame using the remaining of the allocated traffic; and triggering the fourth determining module.

In the embodiment, the device may further include:

a third sending module (not shown in Figures), configured for, if the new intra picture frame does not exist in the buffer, sending a non-picture frame corresponding to a target intra picture frame using the remaining of the allocated traffic, wherein the target intra picture frame is: the newest intra picture frame, or a new intra picture frame detected previously.

In the embodiment, when the data to be transmitted is replay data, the judging sub-module may further configured for:

determining intra picture frames to be sent based on a received replay instruction;

determining whether a traffic used by all the determined intra picture frames to be sent is larger than the allocated traffic;

the selecting sub-module may further configured for:

extracting a target intra picture frame in the determined intra picture frames to be sent as the target data based on the replay instruction and the allocated traffic;

the determining sub-module may further configured for:

extracting a target non-picture frame in non-picture frames corresponding to the intra picture frames to be sent; and determining the target non-picture frame and the intra picture frames to be sent as the target data.

In the embodiment, the selecting sub-module may include:

a first determining unit, configured for determining replay speed information carried in the replay instruction;

a first calculating unit, configured for calculating an extraction interval by using a first preset rule, based on the replay speed information, a size and time interval of the intra picture frames to be sent, and the allocated traffic; and a first extracting unit, configured for extracting the target intra picture frame in the intra picture frames to be sent as the target data at the extraction interval;

the determining sub-module may include:

a second determining unit, configured for determining a size and duration of the replay data based on the replay instruction;

a second calculating unit, configured for calculating an extraction speed by using a second preset rule, based on the size and duration of the replay data, the size and time interval of the intra picture frames to be sent, and the allocated traffic;

a second extracting unit, configured for extracting the target non-picture frame in the non-picture frames corresponding to the intra picture frames to be sent with the extraction speed; and a third determining unit, configured for determining the target non-picture frame and the intra picture frames to be sent as the target data.

In the embodiment, the first calculating unit may further configured for:

calculating the extraction interval by the following formula:

$$\text{Extraction Interval} = \text{Size of Intra picture Frames} / (\text{Allocated traffic} * \text{Time Interval of Intra picture Frames} / \text{Replay Speed});$$

the second calculating unit is further configured for:

calculating the extraction speed by the following formula:

$$\text{Extraction Speed} = \{[\text{Allocated traffic} - (\text{Size of Intra picture Frames} / \text{Time Interval of Intra picture Frames})] / (\text{Size of Replay Data} / \text{Duration of Replay Data}) * (\text{Frame Rate} - 1 / \text{Time Interval of Intra picture Frames})\} / 1 \text{ s}.$$

In the embodiment, the device may further include:

a fourth judging module (not shown in the Figure), configured for determining whether the sum of traffic used by all pieces of data to be transmitted is larger than the available traffic in the network; if the sum is not larger than the available traffic, directly transmitting each piece of data to be transmitted; if the sum is larger than the available traffic, triggering the allocating module;

or, a second monitoring module (not shown in the Figure), configured for monitoring whether preview data in the buffer is overwritten; if no preview data in the buffer is overwritten, directly transmitting each piece of data to be transmitted; if the preview data in the buffer is overwritten, triggering the allocating module;

or, a third monitoring module (not shown in the Figure), configured for monitoring whether a delay in the replay data exists; if no delay in the replay data exists, directly transmitting each piece of data to be transmitted; if the delay in the replay data exists, triggering the allocating module.

By applying the embodiment of the present application shown in FIG. 5, the traffic is allocated to each determined piece of data to be transmitted, when the traffic that needs to be used by the data to be transmitted is larger than the traffic allocated to it, a part of the data to be transmitted is transmitted using this allocated traffic, and the remaining of the data is transmitted after a next traffic allocation is performed. It can be seen that, on one hand, by allocating traffic, the traffic for transmission can be controlled, thereby reducing possibility of network congestion caused by relatively large bandwidth being used for transmitting video resources. On the other hand, if the traffic that needs to be used by the data to be transmitted is larger than the traffic allocated to it, only a part of the data is transmitted, and the remaining of the data will not be transmitted until traffic is allocated again. In other words, the present solution will not block and discard data in a video, and the video can be normally decoded and played.

Figure 6:
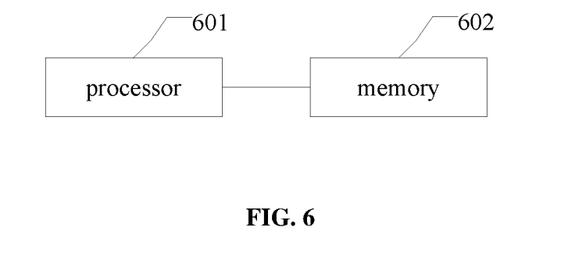
FIG. 6 is a schematic diagram showing a structure of an electronic device according to an embodiment of the present application.

An embodiment of the present application further provide an electronic device as shown in FIG. 6, including: a processor 601 and a memory 602. The memory 602 is used for storing executable program codes, and the processor 601 executes a program corresponding to the executable program codes by reading the executable program codes stored in the memory 602, so as to perform any one of the methods of transmitting video data described above.

An embodiment of the present application further provide an executable program code, which, when executed, performs any one of the methods of transmitting video data described above.

An embodiment of the present application further provide a computer readable storage medium used for storing executable program codes which, when executed, perform any one of the methods of transmitting video data described above.

It should be noted that the relationship terms use here, such as "first," "second," and the like are only used to distinguish one entity or operation from another entity or operation, but do not necessarily require or imply that there is actual relationship or order between these entities or operations. Moreover, the terms "include," "comprise," or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. Specifically, the embodiment of the device for transmitting video data shown in FIG. 5, the embodiment of the electronic device shown in FIG. 6, the embodiment of the executable program code and the embodiment of the computer readable storage medium are described briefly, since they are substantially similar to the embodiments of methods of transmitting video data shown in FIGS. 1-4, and the related contents can refer to the description of the embodiments of methods of transmitting video data shown in FIGS. 1-4.

It can be understood by a person skilled in the art that all or a part of steps in the implementations of the above method can be accomplished by instructing related hardware through programs, which can be stored in a computer-readable storage medium, such as in ROM/RAM, a disk, an optical disk, and so on.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for transmitting video data, comprising:
   determining each piece of data to be transmitted corresponding to each video transmitting request, wherein the data to be transmitted comprises an intra picture frame to be sent;
   allocating a traffic to each determined piece of data to be transmitted at an interval of a preset duration;
   for each piece of data to be transmitted, determining whether the traffic allocated to the piece of data to be transmitted is smaller than a traffic used by the data to be transmitted;
   if the traffic allocated to the piece of data to be transmitted is not smaller than the traffic used by the data to be transmitted, transmitting the data to be transmitted using the allocated traffic;
   if the traffic allocated to the piece of data to be transmitted is smaller than the traffic used by the data to be transmitted, determining whether a traffic used by the intra picture frame to be sent is larger than the allocated traffic; if the traffic used by the intra picture frame to be sent is larger than the allocated traffic, selecting the target data in the intra picture frame to be sent;
   and if the traffic used by the intra picture frame to be sent is not larger than the allocated traffic, determining the intra picture frame to be sent as the target data, wherein a traffic used by the target data is not larger than the allocated traffic;
   transmitting the target data using the allocated traffic; and
   when a traffic is allocated to the data to be transmitted next time, transmitting data in the data to be transmitted other than the target data by using the traffic allocated to the data to be transmitted next time.

2. The method according to claim 1, wherein, the step of allocating a traffic to each determined piece of data to be transmitted comprises:
   determining a weight for each piece of data to be transmitted based on a preset correspondence between data properties and weights; and
   allocating a traffic to each piece of data to be transmitted based on the amount of available traffic in a network in which the data to be transmitted is located and the determined weight.

3. The method according to claim 2, further comprising:
   determining whether a traffic threshold set by a user exists;
   if the traffic threshold exists, determining the amount of available traffic as the traffic threshold; and
   if the traffic threshold does not exist, monitoring the amount of available traffic.

4. The method according to claim 1, wherein, when the data to be transmitted is preview data, the intra picture frame to be sent is the newest intra picture frame in the buffer;

when the traffic used by the intra picture frame to be sent is smaller than the allocated traffic, after transmitting the newest intra picture frame by using the allocated traffic, the method further comprises:
determining whether the remaining of the allocated traffic exists;
if the remaining of the allocated traffic exists, detecting whether a new intra picture frame exists in the buffer;
if the new intra picture frame exists in the buffer, determining whether a traffic used by the new intra picture frame is larger than the remaining of the allocated traffic;
if the traffic used by the new intra picture frame is larger than the remaining of the allocated traffic, sending a part of data in the new intra picture frame using the remaining of the allocated traffic; and
if the traffic used by the new intra picture frame is not larger than the remaining of the allocated traffic, sending the new intra picture frame using the remaining of the allocated traffic; and returning to the step of determining of whether the remaining of the allocated traffic exists.

5. The method according to claim 4, wherein, if the new intra picture frame does not exist in the buffer, the method further comprises:
sending a non-picture frame corresponding to a target intra picture frame using the remaining of the allocated traffic, wherein the target intra picture frame is: the newest intra picture frame, or a new intra picture frame detected previously.

6. The method according to claim 1, wherein, when the data to be transmitted is replay data, the step of determining whether the traffic used by the intra picture frame to be sent is larger than the allocated traffic comprises:
determining intra picture frames to be sent based on a received replay instruction;
determining whether a traffic used by all the determined intra picture frames to be sent is larger than the allocated traffic;
the step of selecting the target data in the intra picture frame to be sent comprises:
extracting a target intra picture frame in the determined intra picture frames to be sent as the target data based on the replay instruction and the allocated traffic;
the step of determining the intra picture frame to be sent as the target data comprises:
extracting a target non-picture frame in non-picture frames corresponding to the intra picture frames to be sent; and
determining the target non-picture frame and the intra picture frames to be sent as the target data.

7. The method according to claim 6, wherein, the step of extracting a target intra picture frame in the determined intra picture frames to be sent as the target data based on the replay instruction and the allocated traffic comprises:
determining replay speed information carried in the replay instruction;
calculating an extraction interval by using a first preset rule, based on the replay speed information, a size and time interval of the intra picture frames to be sent, and the allocated traffic; and
extracting the target intra picture frame in the intra picture frames to be sent as the target data at the extraction interval; and
the step of extracting a target non-picture frame in non-picture frames corresponding to the intra picture frames to be sent comprises:

determining a size and duration of the replay data based on the replay instruction;
calculating an extraction speed by using a second preset rule, based on the size and duration of the replay data, the size and time interval of the intra picture frames to be sent, and the allocated traffic; and
extracting the target non-picture frame in the non-picture frames corresponding to the intra picture frames to be sent with the extraction speed.

8. The method according to claim 7, wherein, the step of calculating an extraction interval by using a first preset rule, based on the replay speed information, a size and time interval of the intra picture frames to be sent, and the allocated traffic, comprises:
calculating the extraction interval by the following formula:

Extraction Interval=Size of Intra picture Frames/
(Allocated traffic*Time Interval of Intra picture
Frames/Replay Speed);

the step of calculating an extraction speed by using a second preset rule, based on the size and duration of the replay data, the size and time interval of the intra picture frames to be sent, and the allocated traffic, comprises:
calculating the extraction speed by the following formula:

Extraction Speed={[Allocated traffic−(Size of Intra
picture Frames/Time Interval of Intra picture
Frames)]/(Size of Replay Data/Duration of
Replay Data)*(Frame Rate−1/Time Interval of
Intra picture Frames)}/1 s.

9. The method according to claim 1, wherein, before the step of allocating a traffic to each determined piece of data to be transmitted at an interval of a preset duration, the method further comprises:
determining whether the sum of traffic used by all pieces of data to be transmitted is larger than the available traffic in the network; if the sum is not larger than the available traffic, directly transmitting each piece of data to be transmitted; if the sum is larger than the available traffic, executing the step of allocating a traffic to each determined piece of data to be transmitted at an interval of a preset duration;
or, monitoring whether preview data in the buffer is overwritten; if no preview data in the buffer is overwritten, directly transmitting each piece of data to be transmitted; if the preview data in the buffer is overwritten, executing the step of allocating a traffic to each determined piece of data to be transmitted at an interval of a preset duration;
or, monitoring whether a delay in the replay data exists; if no delay in the replay data exists, directly transmitting each piece of data to be transmitted; if the delay in the replay data exists, executing the step of allocating a traffic to each determined piece of data to be transmitted at an interval of a preset duration.

10. An electronic device for transmitting video data comprising a processor and a memory, wherein the memory is configured for storing executable program codes, and the processor is configured to:
determine each piece of data to be transmitted corresponding to each video transmitting request, wherein the data to be transmitted comprises an intra picture frame to be sent;
allocate a traffic to each determined piece of data to be transmitted at an interval of a preset duration;

for each piece of data to be transmitted, determine whether the traffic allocated to the piece of data to be transmitted is smaller than a traffic used by the data to be transmitted;

if the traffic allocated to the piece of data to be transmitted is not smaller than the traffic used by the data to be transmitted, transmit the data to be transmitted using the allocated traffic;

if the traffic allocated to the piece of data to be transmitted is smaller than the traffic used by the data to be transmitted, determine whether a traffic used by the intra picture frame to be sent is larger than the allocated traffic; if the traffic used by the intra picture frame to be sent is larger than the allocated traffic, select the target data in the intra picture frame to be sent; and if the traffic used by the intra picture frame to be sent is not larger than the allocated traffic, determine the intra picture frame to be sent as the target data, wherein a traffic used by the target data is not larger than the allocated traffic;

transmit the target data using the allocated traffic; and when a traffic is allocated to the data to be transmitted next time, transmit data in the data to be transmitted other than the target data by using the traffic allocated to the data to be transmitted next time.

11. The electronic device according to claim 10, wherein, the processor is further configured to:

determine a weight for each piece of data to be transmitted based on a preset correspondence between data properties and weights; and allocate a traffic to each piece of data to be transmitted based on the amount of available traffic in a network in which the data to be transmitted is located and the determined weight.

12. The electronic device according to claim 11, wherein the processor is further configured to:

determine whether a traffic threshold set by a user exists;

if the traffic threshold exists, determine the amount of available traffic as the traffic threshold; and if the traffic threshold does not exist, monitor the amount of available traffic.

13. The electronic device according to claim 10, wherein, when the data to be transmitted is preview data, the intra picture frame to be sent is the newest intra picture frame in the buffer;

when the traffic used by the intra picture frame to be sent is smaller than the allocated traffic, after transmitting the newest intra picture frame by using the allocated traffic, the processor is further configured to:

determine whether the remaining of the allocated traffic exists;

if the remaining of the allocated traffic exists, detect whether a new intra picture frame exists in the buffer;

if the new intra picture frame exists in the buffer, determine whether a traffic used by the new intra picture frame is larger than the remaining of the allocated traffic;

if the traffic used by the new intra picture frame is larger than the remaining of the allocated traffic, send a part of data in the new intra picture frame using the remaining of the allocated traffic; and if the traffic used by the new intra picture frame is not larger than the remaining of the allocated traffic, send the new intra picture frame using the remaining of the allocated traffic; and return to the determine whether the remaining of the allocated traffic exists.

14. The electronic device according to claim 13, wherein, if the new intra picture frame does not exist in the buffer, the processor is further configured to:

send a non-picture frame corresponding to a target intra picture frame using the remaining of the allocated traffic, wherein the target intra picture frame is: the newest intra picture frame, or a new intra picture frame detected previously.

15. The electronic device according to claim 10, wherein, the processor is further configured to: when the data to be transmitted is replay data, determine intra picture frames to be sent based on a received replay instruction;

determine whether a traffic used by all the determined intra picture frames to be sent is larger than the allocated traffic;

if the traffic used by the intra picture frame to be sent is larger than the allocated traffic, extract a target intra picture frame in the determined intra picture frames to be sent as the target data based on the replay instruction and the allocated traffic;

if the traffic used by the intra picture frame to be sent is not larger than the allocated traffic, extract a target non-picture frame in non-picture frames corresponding to the intra picture frames to be sent; and determine the target non-picture frame and the intra picture frames to be sent as the target data.

16. The electronic device according to claim 15, wherein, the processor is further configured to: if the traffic used by the intra picture frame to be sent is larger than the allocated traffic, determine replay speed information carried in the replay instruction;

calculate an extraction interval by using a first preset rule, based on the replay speed information, a size and time interval of the intra picture frames to be sent, and the allocated traffic; and extract the target intra picture frame in the intra picture frames to be sent as the target data at the extraction interval; and if the traffic used by the intra picture frame to be sent is not larger than the allocated traffic, determine a size and duration of the replay data based on the replay instruction;

calculate an extraction speed by using a second preset rule, based on the size and duration of the replay data, the size and time interval of the intra picture frames to be sent, and the allocated traffic; and extract the target non-picture frame in the non-picture frames corresponding to the intra picture frames to be sent with the extraction speed.

17. The electronic device according to claim 16, wherein, the processor is further configured to: if the traffic used by the intra picture frame to be sent is larger than the allocated traffic, calculate the extraction interval by the following formula:

Extraction Interval=Size of Intra picture Frames/(Allocated traffic*Time Interval of Intra picture Frames/Replay Speed);

if the traffic used by the intra picture frame to be sent is not larger than the allocated traffic, calculate the extraction speed by the following formula:

Extraction Speed={[Allocated traffic−(Size of Intra picture Frames/Time Interval of Intra picture Frames)]/(Size of Replay Data/Duration of Replay Data)*(Frame Rate−1/Time Interval of Intra picture Frames)}/1 s.

\* \* \* \* \*